Dec. 3, 1935.   C. B. FRITSCHE   2,023,046
CAR BODY STRUCTURE
Filed June 11, 1934   5 Sheets-Sheet 1
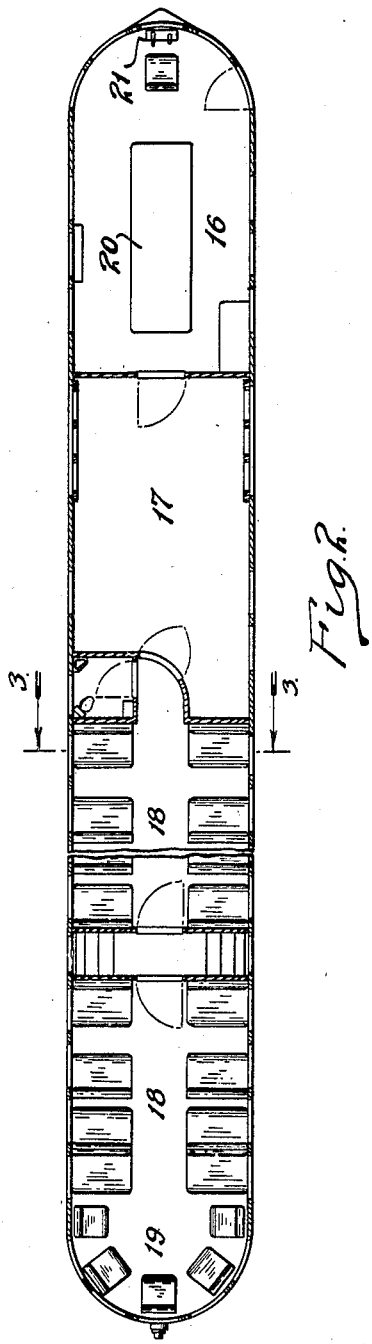
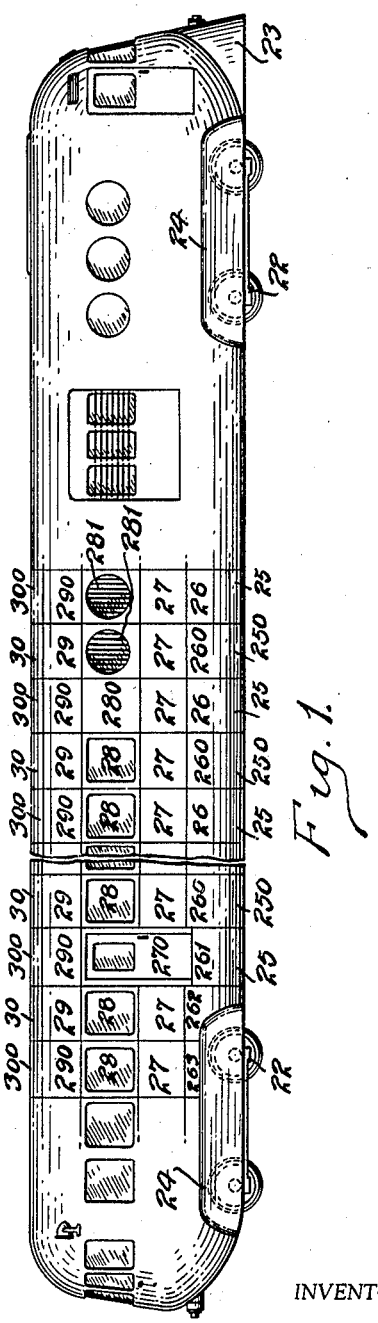
INVENTOR.
CARL B. FRITSCHE.
BY Everett G. Wright
ATTORNEY.

Dec. 3, 1935.  C. B. FRITSCHE  2,023,046
CAR BODY STRUCTURE
Filed June 11, 1934  5 Sheets-Sheet 2
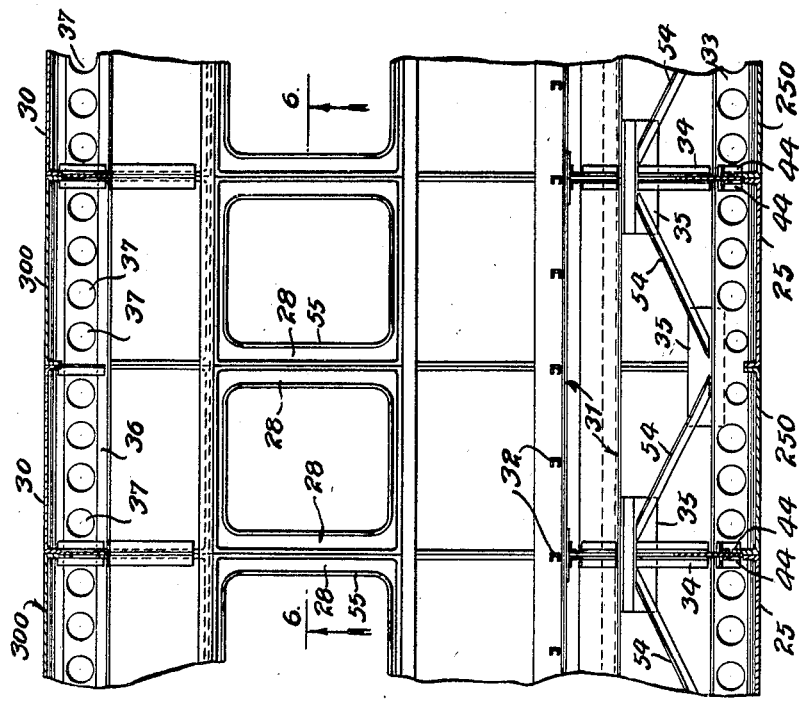
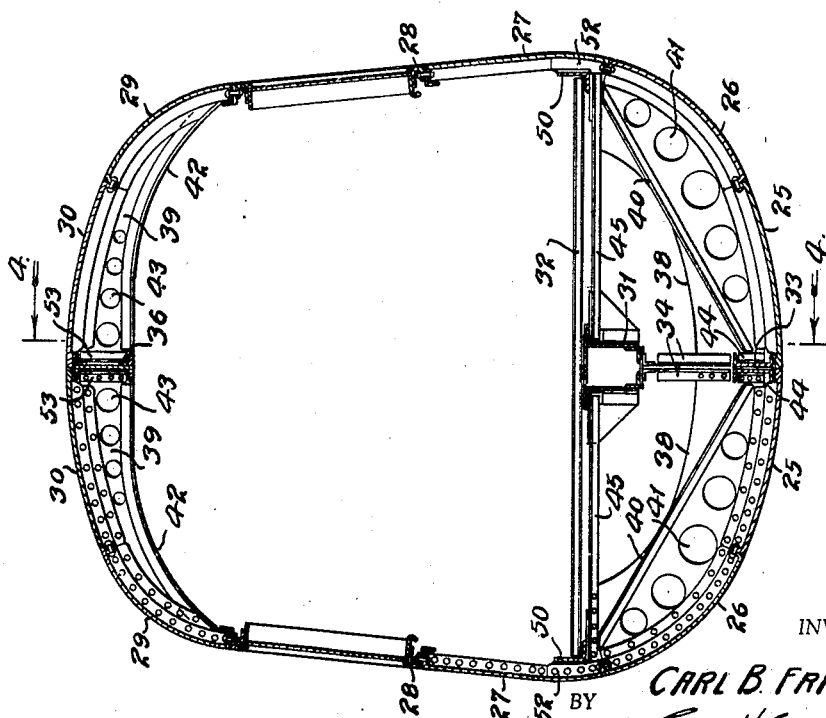
INVENTOR.
CARL B. FRITSCHE.
BY Everett G. Wright
ATTORNEY.

Dec. 3, 1935.  C. B. FRITSCHE  2,023,046
CAR BODY STRUCTURE
Filed June 11, 1934   5 Sheets-Sheet 3
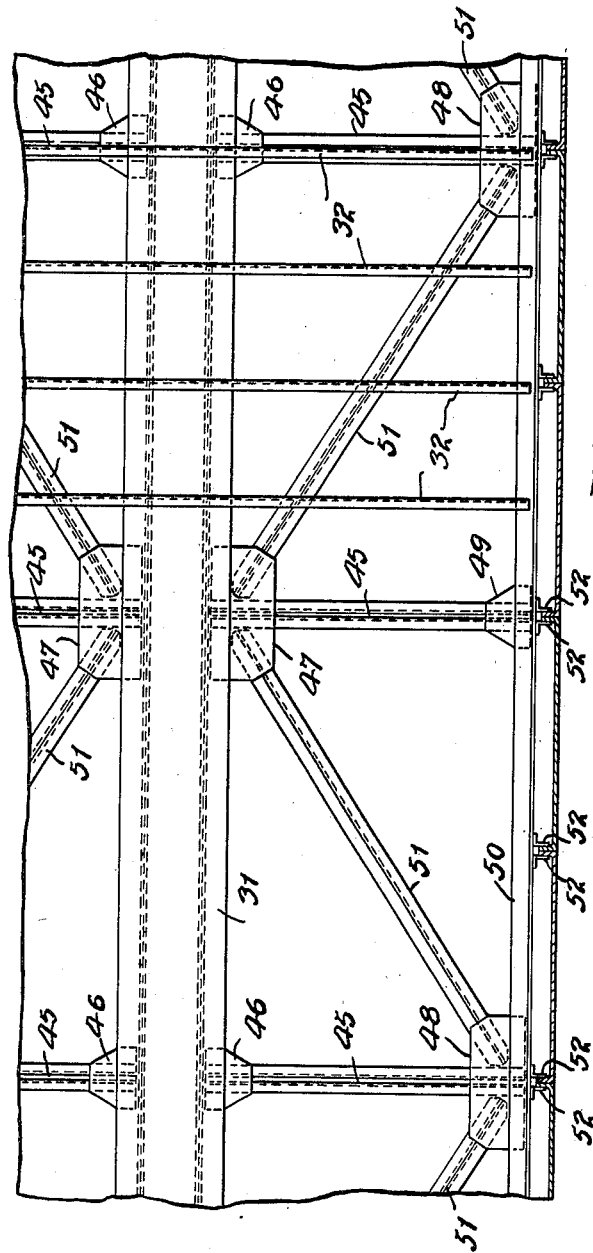
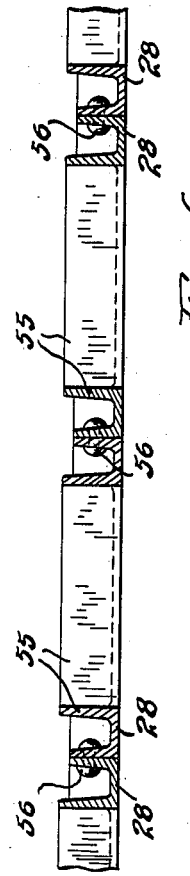
INVENTOR.
CARL B. FRITSCHE.
BY
ATTORNEY.

Dec. 3, 1935.  C. B. FRITSCHE  2,023,046
CAR BODY STRUCTURE
Filed June 11, 1934  5 Sheets-Sheet 4
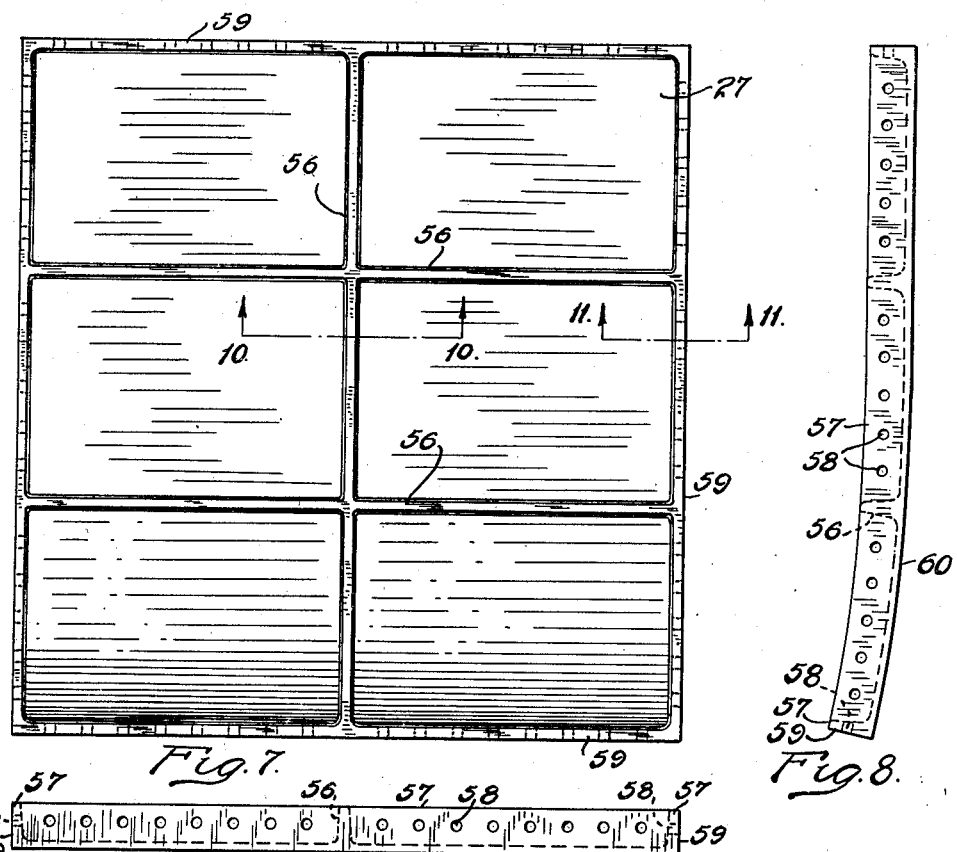
INVENTOR.
CARL B. FRITSCHE.
BY Everett J. Wright
ATTORNEY.

Dec. 3, 1935.  C. B. FRITSCHE  2,023,046
CAR BODY STRUCTURE
Filed June 11, 1934  5 Sheets-Sheet 5
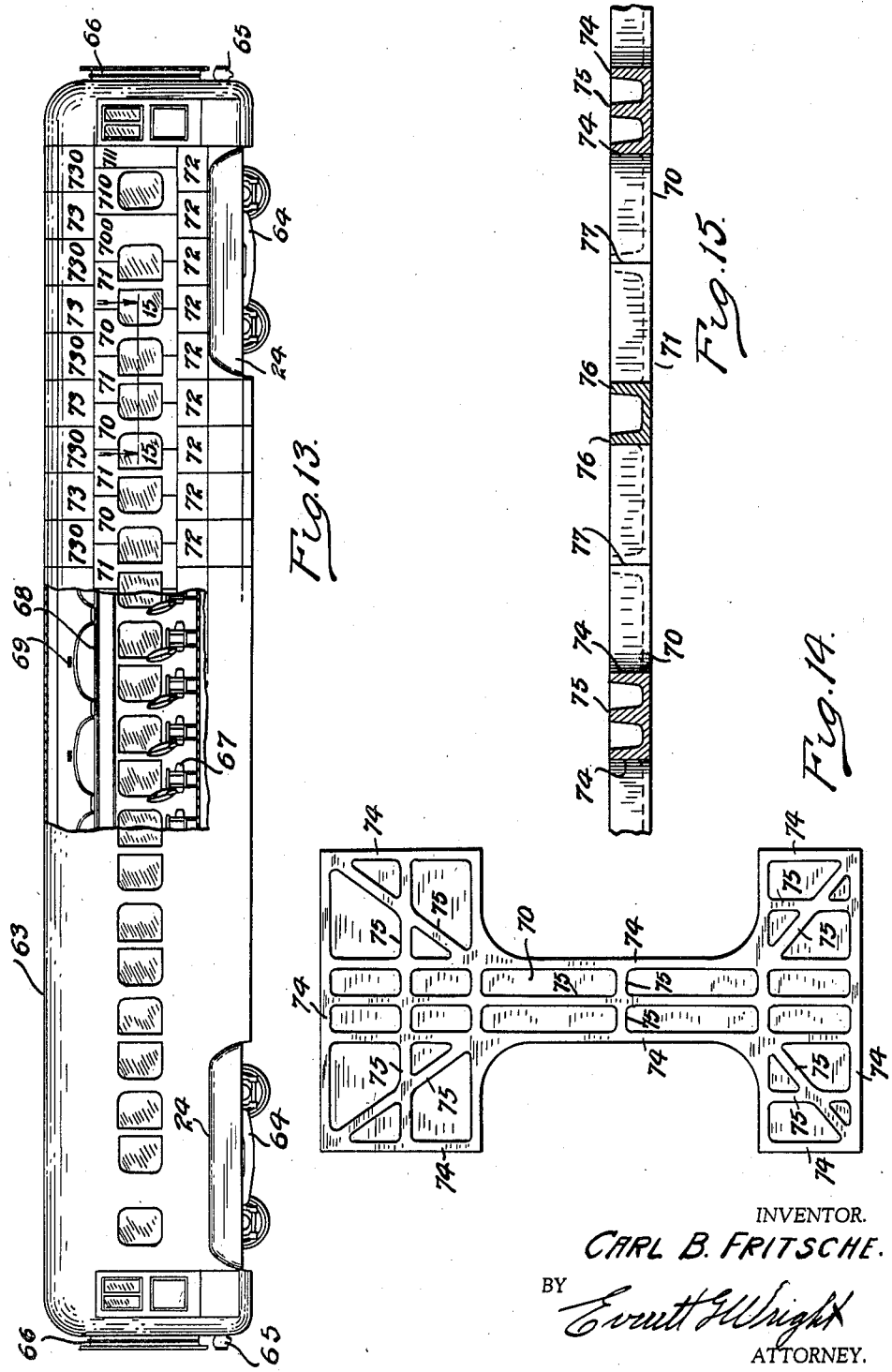
INVENTOR.
CARL B. FRITSCHE.
BY Everett G. Wright
ATTORNEY.

Patented Dec. 3, 1935

2,023,046

UNITED STATES PATENT OFFICE 2,023,046

CAR BODY STRUCTURE

Carl B. Fritsche, Grosse Pointe, Mich., assignor to Beverley G. Fritsche, Grosse Pointe, Mich.

Application June 11, 1934, Serial No. 729,974

14 Claims. (Cl. 105—399)

This invention relates to body structures as applied to railroad cars, however, it may be effectively adapted to street cars, motor coaches, trucks, passenger cars and the like.

The main object of this invention is to provide a car body structure in which excessive weight is eliminated without sacrifice of essential strength.

Another object of this invention is to provide a railroad coach cr other type car having at least an equal collision safety factor to present steel coaches or cars at a weight of approximately one-half the weight of standard steel coaches or cars exclusive of trucks, and at a cost substantially the same as the equivalent railroad equipment constructed of steel.

Another object of this invention is to provide a car body structure comprising a plurality of units, with basic structural units remaining the same for all types of cars and interchangeable units for various types of cars, doors, windows, etc. thereby permitting quantity production in the construction of the said car body structures and parts thereof.

Another object of this invention is to provide a car body structure built up of units capable of economical assembly and erection preferably without the use of jigs and with a minimum amount of riveting as compared to the usual coach construction.

Another object of this invention is to provide a car body structure in which the various units thereof may be easily removed and replaced when required for repair without excessive costs and, in many cases, without the necessity of sending the car to repair shops.

Another object of this invention is to provide a car body structure having smooth exterior surfaces substantially without exposed rivet heads and capable of being finished in modernistic style; the smooth exterior surfaces lending themselves to lacquer or enamel finishing and power machine cleaning.

Another object of this invention is to provide a car body structure comprising a plurality of units which, when secured together, form a composite whole capable of resisting the usual stresses and shocks of service, and capable of effectively resisting the extreme shocks and stresses to which car bodies are subjected under accident conditions.

Another object of this invention is to provide a car body structure comprising a plurality of units which, together with the floor and longitudinal framing, forms in effect a hollow tubular girder capable of resisting tensile, compressive and bending stresses as a composite whole.

Another object of this invention is to provide a car body structure comprising a plurality of flanged light metal sections of such material as magnesium and aluminum alloys and the like cast, forged or otherwise formed into plates and riveted, bolted or welded together transversely and longitudinally preferably through their flanges, to form in effect a hollow tubular girder capable of resisting tensile, compressive and bending stresses as a composite whole.

Still another object of this invention is to provide a light weight metal car body structure comprising a plurality of flanged light metal sections which, when secured together and to the underframe of the car, also of light metal, will act as a unitary tubular girder capable of withstanding operating and accident loads and stresses when made up into trains together with standard steel coaches, thereby permitting gradual replacement of present standard steel coaches by light weight coaches without increasing the accident hazard to travelers.

The drawings refer to an illustrative embodiment of my invention as applied to a streamlined Diesel electric railroad coach. It will be readily observed that the invention is applicable not only to single powered cars but may be adapted to coaches or cars in trains, articulated trains, replacement coaches, buses, trucks and motor vehicles in general requiring strong light body structures.

In the drawings, Fig. 1 is a side elevation of a streamlined railroad coach embodying my invention.

Fig. 2 is a plan view of the said coach showing the general arrangement of the interior thereof.

Fig. 3 is a cross sectional view taken on line 3—3 of Fig. 2 with the interior trim and flooring removed in order to clearly show the invention.

Fig. 4 is a part longitudinal section taken on line 4—4 of Fig. 3 looking in the direction indicated by the arrows showing the underframe and side wall framing in elevation with the glass and window frames removed.

Fig. 5 is a part plan of the car showing the truss type underframe with body units secured thereto.

Fig. 6 is an enlarged vertical section taken on the line 6—6 of Fig. 4.

Fig. 7 is a plan view of a typical car body unit.

Fig. 8 is a side elevation of the typical car body unit shown in Fig. 7.

Fig. 9 is an end elevation of the typical car body unit shown in Fig. 7.

Fig. 10 is a section taken on lines 10—10 of Fig. 7.

Fig. 11 is a section taken on line 11—11 of Fig. 7.

Fig. 12 shows a typical riveted connection between car body units.

Fig. 13 indicates in side elevation another embodiment of my invention showing its application to replacement railroad coaches capable of being made up into trains with standard steel equipment, a portion of the view broken away to indicate the finished interior.

Fig. 14 is an inside view of one of the car body units of the said replacement coach as may be employed between pairs of windows showing the reinforcing ribs thereof.

Fig. 15 is a section taken on the line 15—15 of Fig. 13 with the glass and window frames removed.

Referring now to the embodiment of this invention indicated in Figs. 1–12 inclusive, the particular railroad coach shown is a streamlined Diesel electric railroad coach and is typical of many laid out for day runs having an engine and operator's compartment 16, a combined mail, express and baggage compartment 17, passenger compartments 18 and a smoking lounge or observation section 19. The Diesel electric or other electric power unit 20 produces the necessary electric energy which by means of the controller 21 is imparted to the motorized trucks 22 for moving the coach as desired. The trucks are provided with the usual braking means which is also operated from controller 21 in front of the operator's seat 22. The front fender 23 and air shields 24 opposite the trucks 22 aid in streamlining the coach. Although a particular shaped cross section is shown in Fig. 3 it is to be understood that cars embodying this invention may be of any shape, size, streamlining or layout, this invention being directed to car body structures.

Figs. 3, 4, 5 and 6 show one general arrangement of car body construction contemplated by this invention in which a plurality of car body units preferably formed from light metal alloys such as magnesium and/or aluminum are secured together both transversely and longitudinally and at the same time embrace the car floor framing, underframe and roof framing in such a manner as to tie the body structure and car framing into a composite whole capable of resisting required tensile, compressive and bending stresses.

The car underframe, preferably constructed of a light metal alloy having substantially the same coefficient of expansion as the car body units, may comprise a double webbed longitudinally disposed center girder 31 located just below any desired transverse flooring supports 32, and a pair of channels 33 which form the upper and lower chords respectively of a longitudinal truss having web members 34 and 54 secured to the said chords by gussets 35. A longitudinal roof girder 36 is located directly above the said underframe and is provided with holes 37 to reduce its weight.

On a portion of Fig. 1 the lines of joint between various car body units have been indicated and the car units have been numbered to designate their type. The typical units are 25–30 inclusive and 250, 260, 290 and 300; special units 261, 262, 263, 270, 280 and 281 are indicated to show how few special units are necessary to construct cars for various types of service, the typical units remaining the same while interior trim, doors and window openings may be varied as desired.

The car body units are placed in their proper positions relative to each other and the car underframe and roof girder, and are transversely secured together and to the said underframe and roof girder preferably by riveting or bolting through holes provided in their flanges.

In a longitudinal direction the said car body units are secured together in a similar manner. Alternate units 250, 260, 290 and 300 are provided with extra deep flanges to which are secured transverse plates 38 and 39 respectively which tie the car body units to the underframe, floor framing, and roof framing making in effect a series of transverse girders at alternate longitudinal joints between car body units thereby making the car body structure a unitary composite whole. Transverse plates 38 are reinforced by angles 40 and are provided with holes 41 for reducing their weight; similarly, transverse plates 39 are reinforced by angles 42 and are provided with holes 43 for reducing their weight.

The transverse plates 38 are secured to the vertical longitudinal truss web members 34, car body units 250 and 260, and to clip angles 44 on channels 33 preferably by riveting or bolting through holes provided therefor. The transverse plate 38 also supports horizontally disposed transverse floor truss web members 45, the opposite ends of which are secured to center girder 31 by means of gussets 46 and 47 therebetween. Gussets 48 and 49 support the outer floor truss chord member 50 and the diagonal floor truss web members 51. Two complete horizontally disposed floor trusses, one on each side of the center of the car are thereby formed, of which the center girder 31 acts as a common chord, each truss having an outer chord member 50 as its other chord, and transverse and diagonal members 45 and 51 acting as the web members. The car body units 27 are secured to the outer chord member 50 of the floor trusses by means of clip angles 52.

Similarly, transverse plates 39 are secured to car body units 290 and 300, and to clip angles 53 on longitudinal roof girder 36 preferably by riveting or bolting through holes provided therefor.

Fig. 6 shows one method of reinforcing the car body structure around openings, namely, the car body units 28 are provided with inwardly extending flanges 55 around the opening therein which compensate in strength for the said plate metal omitted. The car body units 28 are shown secured together by rivets 56, however any adequate method may be employed such as bolting, welding and the like.

Figs. 7–11 inclusive show a typical car body unit such as unit 27 of Figs. 1 and 3. The said body unit is preferably provided with two horizontal and one vertical reinforcing ribs 56. The peripheral flanges 57 are provided with a plurality of holes 58 to register with like holes in other body units, framing, gussets and the like for riveting, bolting or otherwise securing the same as may be required. The peripheral surfaces 59 are preferably machined or ground smooth, square and true to dimension. The outside surface 60 may be rough ground, sand blasted or wire brushed, etc., all according to the type of finish to be given the completed car body structure.

Fig. 12 indicates one means of securing two car body units 27 together, namely by the rivets 61, the shaded portion 62 indicating any known waterproofing compound, gasket or joint paste that may be used to assure a tight joint between car body units.

It will be noted that no means for securing interior finish or trim to the inside of the car body structure has been disclosed. The interior finish is not within the scope of this invention and may be substantially omitted on freight, express and mail cars. However, the exterior metals being contemplated are magnesium or aluminum alloys and the like which may be readily drilled and tapped for securing the interior trim thereto or any other known means may be employed for securing the same and for insulating, finishing, trimming and otherwise furnishing the interior of said car body structures.

Another embodiment of this invention is shown in Figs. 13, 14 and 15, of which Fig. 13 is a side elevation of the invention as applied to a standard railroad day coach, a portion being broken away to indicate the interior arrangement. The coach comprises in general a body portion 63 which is mounted on trucks 64 having air shields 24 over the same, and is provided at the ends with couplers 65 which enable the coach to be made up into trains with other equipment. The flexible bellows type hoods 66 permit safe passage to and from adjacent coaches (not shown) when the coaches are coupled into trains. The interior of the coach is provided with a plurality of seats 67, luggage racks 68 and fresh air registers 69 connected, if desired, to a cooling system. The coach construction is quite similar to the embodiment of my invention shown in Figs. 1–13 inclusive except that car body units at the windows have been altered to permit the windows to be grouped in pairs as indicated in Fig. 13 and to provide alternately wide and narrow car body units 70 and 71 respectively which have joints staggered with those of adjoining car body units 72, 73 and 739. Car body units 72, 73 and 730 being similar to car body units 27, 29 and 290 respectively of Figs. 1 and 3 except this embodiment has vertical sides and requires car body units accordingly.

Fig. 14 is an enlarged view of car body unit 70 having peripheral flanges 74 and reinforcing ribs 75. Holes may be provided in the peripheral flanges 74 as required for securing car body units together as indicated in Figs. 7, 8, 9 and 12.

Portions of two wide car body window spacing units 70 and one narrow window spacing unit 71 having flanges 76 are shown in Fig. 15 with joints 77 therebetween.

The embodiment shown in Figs. 13, 14 and 15 indicates the wide range and detail of the application of this invention to various types, sizes and shapes of cars and especially how joints in plates may be staggered and various widths of window spacing units may be constructed as required for any type of car body structure without departing from this broad invention. Numerals 700, 710 and 711 of Fig. 13 indicate a few of the variously shaped and sized car body units that are contemplated by this invention which are flanged and reinforced by ribs in a manner similar to car body units 27 and 70 hereinbefore described. The floor framing, underframing and roof framing of the embodiment shown in Fig. 13 is similar in general respects to that shown in Figs. 3, 4 and 5.

It will be readily observed that a car body structure preferably made of light metal alloys and in accordance with the invention disclosed herein will not only resist the tensile, compressive and bending strains of ordinary service but will act as a composite whole in resisting heavy accident shocks, and, regardless of being constructed of light metal alloys at approximately 50% of the weight of present standard steel railroad equipment, will permit its use as replacement equipment in trains mixed with present standard steel coaches without an increased accident hazard and with extremely advantageous operating economies in savings of dead weights hauled per passenger, or, in the case of freight, express and mail equipment in savings of dead weight hauled per ton of pay load.

It will be obvious that various changes may be made in the arrangement, combination and construction of the various parts of my improved car body structures without departing from the spirit of my invention, and it is my intention to cover by my claims such changes as may be reasonably included within the scope thereof.

I claim:

1. A car body structure having an underframe, floor framing and longitudinal roof framing; transverse plates secured to said underframe, floor framing and roof framing, and a plurality of inwardly flanged car body units secured together both transversely and longitudinally and to said transverse plates to permit said framing and car body units to act as a composite whole when resisting tensile, compressive and bending stresses resulting from both service and accident shocks.

2. A car body structure having an underframe, floor framing and longitudinal roof framing; transverse plates secured to said underframe, floor framing and roof framing, and a plurality of inwardly flanged car body units secured together both transversely and longitudinally at their flanges, alternate car body units being provided with extra deep transverse flanges at transverse plates secured to the said transverse plates to permit said framing and car body units to act as a composite whole when resisting tensile, compressive and bending stresses resulting from both service and accident shocks.

3. A car body structure having an underframe, floor framing and longitudinal roof framing; transverse plates secured to said underframe, floor framing and roof framing, and a plurality of inwardly flanged light metal alloy car body units secured together both transversely and longitudinally at their flanges, alternate car body units being provided with extra deep transverse flanges at transverse plates secured to the said transverse plates to permit said framing and car body units to act as a composite whole when resisting tensile, compressive and bending stresses resulting from both service and accident shocks.

4. In a car body structure, in combination, a truss type underframe having a girder for its top chord, double truss type floor framing utilizing the top chord of the underframe as a common chord, longitudinal roof framing, inwardly flanged car body units secured together both transversely and longitudinally at their flanges, and transverse plates secured respectively to said framing and car body units to form a composite whole.

5. In a car body structure, in combination, a truss type underframe having a girder for its top chord, double truss type floor framing utilizing the top chord of the underframe as a common chord, longitudinal roof framing, inwardly flanged light metal alloy car body units secured together both transversely and longitudinally at their flanges, and transverse plates secured respectively to said framing and car body units to form a composite whole.

6. In a car body structure, a longitudinal underframe, longitudinally disposed horizontal double truss type floor framing, a longitudinal central roof member, a plurality of inwardly flanged car body units secured together both transversely and longitudinally at their flanges, and transverse plates near the top and bottom of the said car body structure secured respectively to said framing and to extended transverse flanges of said flanged car body units to form in effect a composite whole.

7. In a car body structure, a longitudinal underframe, longitudinally disposed horizontal double truss type floor framing, a longitudinal central roof member, a plurality of light metal alloy inwardly flanged car body units secured together both transversely and longitudinally at their flanges, and transverse plates near the top and bottom of the said car body structure secured respectively to said framing and to extended transverse flanges of said flanged car body units to form in effect a composite whole.

8. In a light metal alloy car body structure, a longitudinal underframe, longitudinally disposed horizontal double truss type floor framing, a longitudinal central roof member, a plurality of inwardly flanged car body units secured together both transversely and longitudinally at their flanges, and transverse plates near the top and bottom of the said car body structure secured respectively to said framing and to extended transverse flanges of said flanged car body units to form in effect a composite whole.

9. In a car body structure, an underframe, floor framing and roof framing, a plurality of inwardly flanged car body units secured together both transversely and longitudinally at their flanges, reinforcing ribs integal with said car body units, and transverse plates near the top and bottom of said car body structure secured respectively to said framing and to extended transverse flanges of said flanged car body units to form in effect a composite whole.

10. In a car body structure, an underframe, floor framing and roof framing, a plurality of light metal alloy inwardly flanged car body units secured together both transversely and longitudinally at their flanges, reinforcing ribs integral with said car body units, and transverse plates near the top and bottom of said car body structure secured respectively to said framing and to extended transverse flanges of said flanged car body units to form in effect a composite whole.

11. In a light metal alloy car body structure, an underframe, floor framing and roof framing, a plurality of inwardly flanged car body units secured together both transversely and longitudinally at their flanges, reinforcing ribs integral with said car body units, and transverse plates near the top and bottom of said car body structure secured respectively to said framing and to extended transverse flanges of said flanged car body units to form in effect a composite whole.

12. In a car body structure, in combination, an underframe, floor framing, roof framing, a plurality of inwardly flanged and ribbed car body units secured to each other, and spaced transverse plates secured respectively to said framing and car body units near the top and bottom of said car body structure.

13. In a car body structure, in combination, a plurality of inwardly flanged light metal alloy car body units secured together both transversely and longitudinally at their flanges, a truss type underframe having a girder for its top chord, double truss type floor framing utilizing the top chord of the underframe as a common chord, longitudinal roof framing, and means for causing co-action of the said car body units and the said framing to resist both service and accident shocks.

14. In a car body structure, an underframe, floor framing and roof framing, a plurality of light metal alloy inwardly flanged car body units secured together both transversely and longitudinally at their flanges, and means near the top and bottom of said car body structure secured respectively to said framing and to extended transverse flanges of said flanged car body units for causing co-action of the said car body units and the said framing to resist both service and accident shocks.

CARL B. FRITSCHE.